Dec. 30, 1947. W. I. BEACH ET AL 2,433,643
PROCESS OF TREATING PHENOLIC SHEET
Filed Nov. 11, 1943 2 Sheets-Sheet 2

INVENTORS.
W. I. Beach, R. L. Whann,
and A. S. Peterson
by Carlos G. Stratton ATTORNEY Patented Dec. 30, 1947

2,433,643

UNITED STATES PATENT OFFICE 2,433,643

PROCESS OF TREATING PHENOLIC SHEET

William I. Beach and Robert L. Whann, Los Angeles, and Algot S. Peterson, Inglewood, Calif., assignors to North American Aviation, Inc., Inglewood, Calif., a corporation of Delaware Application November 11, 1943, Serial No. 509,870

15 Claims. (Cl. 18—56)

This application is a continuation in part of application S. N. 479,172, filed on March 15, 1943, now abandoned.

Our invention relates to the forming of sheet materials and has as its general object to provide a process by which those materials commonly known as thermo-setting and which, in the state generally designated as fully cured, have been widely looked upon as being non-formable, may be formed into members having simple and compound curves in both large and small radii.

The thermo-setting material with which the invention deals is not to be confused with the thermo-plastic group of materials, including cellulose nitrates, cellulose acetates, polystyrene, methyl-methacrylate, and many vinyl derivatives. The present invention contemplates the forming of sheet material of the type comprising a suitable absorbent base sheet such as, for example, woven fabric or porous paper, impregnated with a thermo-setting resin such as phenol, urea, or melamine formaldehyde resin, or phenol furfural resin. The resin may be pure phenol, ortho, meta, or para-cresol, or one of the various xylenols, or analine. These resins shall be hereinafter called "aldehyde condensation resins."

Sheet materials of this class, in what has been commonly understood to be the fully cured state, have been commonly designated as "C-stage" thermo-setting materials. Such materials are produced by polymerization under heat and pressure. The polymerization temperature normally ranges in the neighborhood of 300° F. The pressure, under what is known as the "high pressure" method, may range through several thousand pounds per square inch, and under what is known as the "low pressure" method, may be as low as 250 pounds per square inch. The invention contemplates the forming of all such materials into articles having form retaining shapes deviating from the original flat plane of the sheet stock. The present invention provides a process by which this may be accomplished and involves the discovery that the previous universally held understanding that such forming was impossible, has in fact been erroneous.

In the manufacture of the phenolic sheet material for which the present invention provides a forming process, phenol, either pure phenol, ortho, meta, or para-cresol, or one of the xylenols, is mixed with an aldehyde, such as, for example, formaldehyde, in the presence of a catalyst and subjected to heat and agitation to produce a viscous liquid resin in what is known as the "A" stage. This resin is soluble in alcohol.

In the laminating step, sheets of cloth or other absorbent materials are impregnated with the "A" stage resin diluted in alcohol, and then dried, in the presence of heat. The resin is partially polymerized to become what is known as the "B" stage resin, which is no longer soluble in alcohol, but is soluble in acetone.

In the third stage, the "B" stage impregnated sheets are assembled in stacks and pressed together between heated platens at the temperatures and pressures previously stated, thus producing the "C" stage laminated material. Polymerization is accompanied by an exothermic reaction. The curing is permitted to continue until the exothermic reaction substantially subsides. At this stage, the process is stopped, resulting in what is commonly known as completely cured, thermo-setting material. It is known that by greatly extending the curing process, a slightly higher stage of curing may be effected, but the increment of additional cure, for a given period of time, is relatively small in comparison to that achieved during the exothermic reaction. Because of this almost complete cessation of polymerization, it has been customary to terminate the process at that stage and to regard the resulting product as completely cured thermo-set "C" stage material. It has been found that the present invention makes possible the post-forming even of sheets that have been cured to an extent of 100% beyond the normal stopping point where the rapid rate of polymerization ceases.

A further object of the invention is to provide a process of forming cured thermo-setting sheet material in an inexpensive manner. To this end, the invention contemplates the use of inexpensive dies constructed of wood or equivalently inexpensive material.

Another object of the invention is to provide a process by which cured thermo-setting sheet material may be formed without reducing the strength of the material.

The invention also comprises novel process steps and novel combinations and arrangements of steps, which will more fully appear in the course of the following description. However, the drawings merely show and the following description merely describes embodiments of the present invention, which are given by way of illustration or example only.

In the drawings, like reference characters designate similar parts in the several views.

Figure 1:
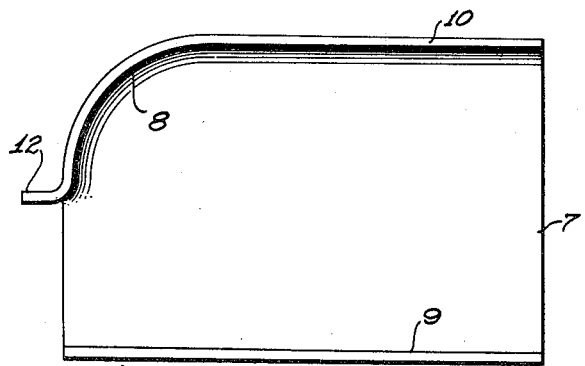
Fig. 1 is a plan view of thermo-setting material formed by the present process.

Referring more in detail to the drawings, Fig. 1 illustrates a sheet of thermo-setting material that has been formed. The body is shown at 7 with a compound curve at 8. A substantially straight flange 9 and a longitudinally curved flange 10 extend in parallel relation along the major portion of the body 7. An endwise extending tab 12 is shown at one end of the finished product. This figure is given by way of illustration only.

Figure 2:
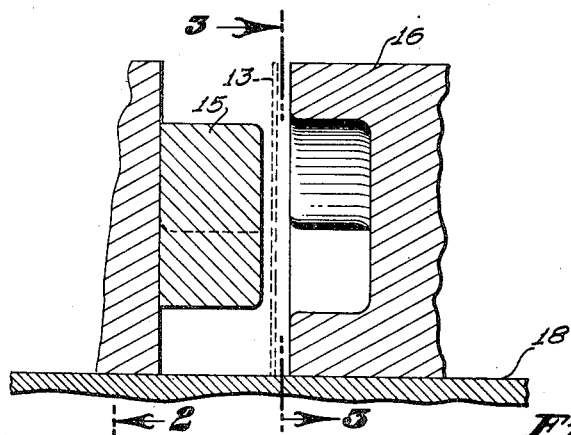
Fig. 2 is a broken sectional view of die elements prior to the forming operation, taken on the line 2—2 of Fig. 3.
Figure 3:
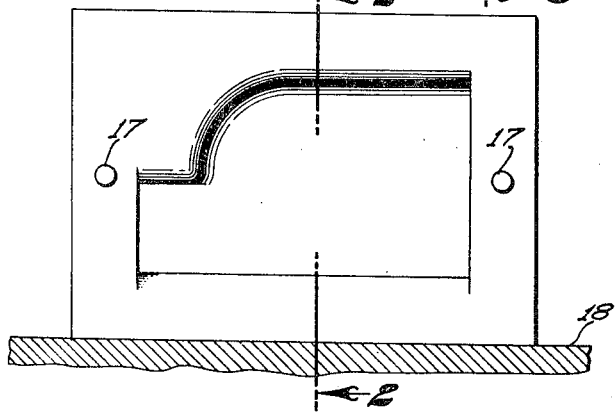
Fig. 3 is a face view of the female die element looking in the direction of arrows 3—3 of Fig. 2.
Figure 4:
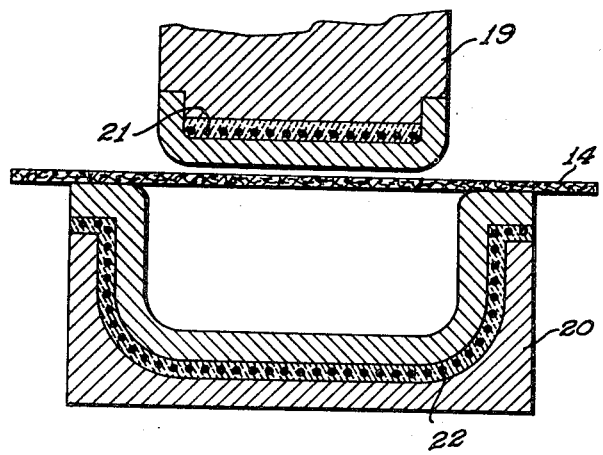
Fig. 4 is a broken, sectional view of modified die elements prior to the forming operation.

The material to be operated upon usually comes in flat sheets as indicated in broken lines 13 in Fig. 2, or in full lines at 14 in Fig. 4. The first step in the process is cutting from flat sheets of "C" stage thermo-setting material, blanks of the desired shape. This may be done in any suitable manner, such as by die blanking.

The next step in the process is to soften the blank. This is done by subjecting the blank to heat in a suitable manner, as, for example, by exposing the blank to the dry heat of an oven until the material attains a softening temperature. This temperature may range from approximately 250° F. to approximately 350° F. We have found that a very satisfactory or optimum forming or molding state temperature is in the neighborhood of 300° F. When the material is thoroughly heated to this temperature, we find that it is in a sufficiently soft state to be readily formed into a variety of useful shapes.

The length of time required to soften the blank in an oven depends upon oven temperature. Where the oven temperature is 350° F., a blank of ⅛-inch panelyte may be brought from a temperature of about 70° F. to a temperature of 250° F. in approximately 100 seconds, and to a temperature of 300° F. (optimum molding or forming temperature) in about 165 seconds. The same material in an oven temperature of 500° F. will reach a temperature of 250° F. in about 61 seconds and the optimum molding or forming temperature of 300° F. in about 90 seconds. It is preferred, in actual practice, to employ an oven temperature of 500° F. and a heating period of about 55 seconds for the 1/16-inch material usually employed in present day forming operations. Because the optimum molding or forming temperature is near the temperature (360° F.) at which the material will start to blister and disintegrate, and because of the rapidity with which the optimum temperature is reached, it is not considered practicable to employ an oven temperature much in excess of 500° F. Conversely, it is not considered desirable to employ a heating period of more than three minutes, partially because of the inefficiency resulting from the unnecessary consumption of time, and partially because extended exposure to heat tends to deteriorate the thermo-setting material as previously stated, extension of cure of C-stage material will result in a somewhat higher stage of cure of polymerization. This is a factor in the deterioration that results from a too prolonged heating period. Accordingly, it is preferred to raise the blank to its optimum molding or forming temperature as rapidly as possible without subjecting the blank to a dangerously high heating medium temperature. Such optimum moldable or formable state may be said to be that state in which the material is sufficiently soft and pliable to withstand fairly sharp bends (simple or compound) of the order of ⅛" radius in 1/16" material without cracking (definite rupture of a lamination in a region of tension produced by the bending), checking (development of fine cracks in the resin without rupture of the fabric), or blistering (produced by internal gas pressure of volatile components against the outer laminations).

Where a heating medium having a higher rate of heat conductivity than that of air or any other heating method more rapid than oven heating is employed, the heating periods may, for given temperatures of the medium, be shorter than the periods given above. Examples of heating methods that can be used instead of oven heating are: Heating in a liquid bath; heating by conduction from heated plates between which the blank is engaged; subjecting the blank to the heating effect of a high frequency alternating electric field in which the blank acts as a dielectric in which heat is produced by dielectric losses; and heating by radiation from a source of radiant heat energy such as, for example, infrared rays.

The next step in the process is to remove the heated and softened blank from the heating medium and transfer it to the forming die. We find that it is important, in this step, to make this transfer as rapidly as possible, so as to maintain the temperature of the blank as nearly as possible at the temperature at which it leaves the heating medium, thereby maintaining to a maximum degree the plasticity of the material as it leaves the heating medium. In actual practice, the blank is immediately placed in a forming die upon removal from the heating medium. We find that it is possible to permit as much as 15 to 20 seconds of time to elapse between the removal from the heating medium and the placement in the die. However, the customary practice is to effect the transfer within a period of from 3 to 5 seconds, or less.

The step of transferring the blank from the heating medium to the die may be eliminated by employing heated dies as shown in Sheet II of the drawings, and described more in detail hereinafter.

The heated material is formed to the desired shape by applying pressure to it in a forming die consisting of male and female elements. A desirable feature of this invention is that expensive steel dies are not necessary inasmuch as the forming pressures are relatively low. For this purpose, dies may be cast from metallic alloys, such as Kirksite, or may be cast from heat resistant plastic materials, or may be made of wood or any equivalent composition material. In actual practice wood, especially hardwood, has been found to be entirely satisfactory for forming of many parts.

Fig. 2 shows the male and female elements 15 and 16 of the die ready to be moved together, thereby to form the pre-heated "C" stage thermo-setting material 13. Guides 17 may be employed at the sides of the male die member 15, to cause it to follow a definite path toward and from the female element. The die members 15 and 16 and the material 13 are shown as resting upon a table 18. The material is allowed to substantially cool after it has been formed and while it is still in the die, so that it will become set in its new shape.

We find that it is important to maintain the material under pressure in the dies until the resin has cooled sufficiently to restrain the fabric from warping or twisting or returning to its original flat shape, or, in the alternative, to restrain the blank in the die until it has cooled sufficiently to retain its shape long enough to permit it to be transferred from the die to a cooling medium in which it is rapidly quenched without having time to lose its shape. Cooling in the die may be accomplished either by permitting the blank to remain in the die sufficiently to permit the assembly to cool off through air convection, or may be accomplished by providing a cooled die, for example, a die having cooling chambers in which a coolant medium is circulated. We find that the material may be removed from the die at a temperature of approximately 200° F. It may subsequently be handled without further cooling or restraint, and without losing its shape to any undesirable degree. On the other hand, we find that the blank may be removed from the die at a temperature of approximately 250° F., and if immediately plunged into a quenching bath in which its temperature may be reduced below the 200° F. point almost instantaneously, it will be brought to the form retaining condition without losing its shape to any undesirable degree. It will be understood that in either case there may be a slight opening up of the formed member, but not to an objectionable extent.

If desired, a next step could be to trim the material. Of course, this step will be eliminated if the material comes out of the die in the form desired.

In Sheet II of the drawings, a heated die is shown as having male and female members 19 and 20. The die members are shown as being individually heated. This heating may be done by any suitable means. Fig. 4 shows electric wires 21 and 22 imbedded in the bodies of the die elements. This heated die has the advantage of being able to heat and form the material 14 in a single operation. The die elements 19 and 20 are preferably metallic in order that they may more adequately convey the heat generated by the electric heating elements imbedded therein. However, the metal does not have to be hard steel dies but may be of light and inexpensive metal.

In operation, the die elements 19 and 20 may be raised to a sufficiently high temperature to raise the temperature of the material 14 throughout to an optimum forming temperature; e. g., 300° F. This forming operation is continued until the male die has been moved home. After the forming step, the electric current supplying the heating elements 21 and 22 may be turned off and the material allowed to remain in the die until the die elements and material have cooled sufficiently for the material to retain the shape imparted to it.

Figure 5:
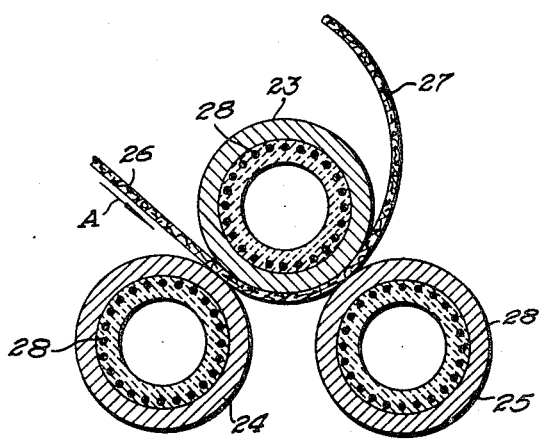
Fig. 5 is a transverse sectional view of rollers illustrating a forming operation, taken on the line 5—5 of Fig. 6.
Figure 6:
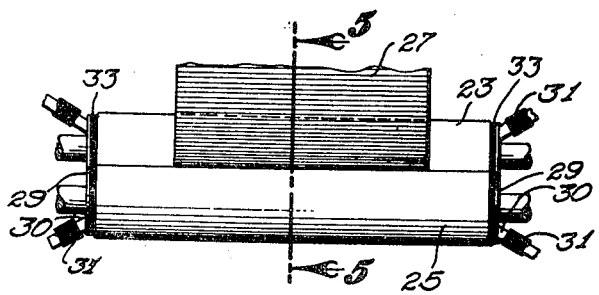
Fig. 6 is an elevational view of the forming rollers, shown in Fig. 5.

In the forms shown in Figs. 5 and 6 in the drawings, rollers 23, 24 and 25 are shown as bending material from the flat sheet form shown at 26 to the curved form shown at 27. The rollers 23, 24 and 25 are shown as having electric heating elements 28 embedded therein. Conductive bands 29 may be employed at the ends of the rollers, to be engaged by brushes 30 included in suitable circuits by insulated wires 31, whereby to supply current to the electric heating elements during rotation of the rollers. Insulation 33 may be employed between the metal shells of the rollers 23, 24, and 25 and the heating elements 28.

In the operation of the process shown in Figs. 5 and 6, the material 26, in flat form, is fed between the rollers in the manner shown in Fig. 5. The rollers are brought to a temperature sufficiently high to bring the temperature of the material 26 throughout to an optimum forming temperature, e. g., 300° F. What is necessary is that the material be sufficiently softened to be shaped, but be heated to a point below its charring point. It is to be understood that rollers of smaller diameter will cause the material to have shorter radii, and that rollers of greater diameter will form the material into curves having greater radii than the material shown in Fig. 5.

While we have illustrated and described what we now regard as the preferred embodiments of our invention, the constructions are, of course, subject to modification without departing from the spirit and scope of our invention. We, therefore, do not wish to restrict ourselves to the particular forms of construction illustrated and described, but desire to avail ourselves of all modifications that may fall within the scope of the appended claims.

Having thus described our invention, what we claim and desire to secure by Letters Patent is:

1. The process of shaping thermo-setting material which comprises heating C-stage thermosetting sheet material to a temperature of between 250° F. and 350° F. with sufficient rapidity to prevent substantial deterioration thereof and for not more than about three minutes, whereby the material is placed in a moldable condition, shaping the material while in that condition, and permitting the material to cool.

2. The process of shaping thermosetting material which comprises heating C-stage thermosetting sheet material to a temperature of between 250° F. and 350° F. with sufficient rapidity to prevent substantial deterioration thereof and for not more than about three minutes, whereby the material is placed in a moldable condition, immediately shaping the material while in that condition, and restraining the material in the shape thus imparted to it while allowing it to cool to shape-retaining condition.

3. The process of shaping thermosetting material which comprises heating C-stage thermosetting resin impregnated laminated fabric sheet material of $\frac{1}{16}''$ thickness to a temperature of between 250° F. and 350° F. with sufficient rapidity to prevent substantial deterioration thereof and for not more than about three minutes, whereby the material is placed in a moldable condition, shaping the material while in that condition and restraining the material in the shape thus imparted to it while allowing it to cool.

4. The method of shaping material of the type comprising an absorbent material impregnated with a thermosetting aldehyde condensation resin in the "C" stage, which resin has the characteristic of having an optimum formability and moldability within a substantially predetermined temperature range, of deteriorating upon extended exposure to temperatures within said predetermined temperature range, and of deteriorating when at temperatures higher than the highest temperature in said predetermined temperature range, which consists in initially subjecting the material to the action of a heating medium having a temperature greater than the highest temperature in said predetermined range for a time sufficient only to produce within the material a temperature within said predetermined range whereby substantially no deterioration of the material due to temperature takes place, and shaping the material while within said predetermined range and before the material has deteriorated due to extended exposure of the material to temperatures within said range.

5. The method of shaping material of the type comprising an absorbent material impregnated with a thermosetting aldehyde condensation resin in the "C" stage, which resin has the characteristic of having an optimum formability and moldability within a substantially predetermined temperature range, of deteriorating upon extended exposure to temperatures within said predetermined temperature range, and of deteriorating when at temperatures higher than the highest temperature in said predetermined temperature range, which consists in initially subjecting the material to the action of a heating medium having a temperature greater than the highest temperature in said predetermined range for a time sufficient only to produce within the material a temperature within said predetermined range whereby substantially no deterioration of the material due to temperature takes place, shaping the material while within said predetermined range and before the material has deteriorated due to extended exposure of the material to temperatures within said range, and then allowing the material to cool.

6. The method of shaping material of the type comprising an absorbent material impregnated with a thermosetting aldehyde condensation resin in the "C" stage, which resin has the characteristic of having an optimum formability and moldability within a substantially predetermined temperature range, of deteriorating upon extended exposure to temperatures within said predetermined temperature range, and of deteriorating when at temperatures higher than the highest temperature in said predetermined temperature range, which consists in initially subjecting the material to the action of a heating medium having a temperature greater than the highest temperature in said predetermined range for a time sufficient only to produce within the material a temperature within said predetermined range whereby substantially no deterioration of the material due to temperature takes place, shaping the material while within said predetermined range and before the material has deteriorated due to extended exposure of the material to temperatures within said range, and restraining the material in the shape thus imparted to it while allowing the material to cool to shape retaining condition.

7. The process of shaping thermo-setting material which comprises heating C-stage thermosetting resin impregnated fabric sheet material, for a period of not more than three minutes, to a temperature in the neighborhood of 300° F. so as to impart to the material optimum forming flexibility, shaping the heated material, and permitting the material to cool.

8. The process of shaping thermo-setting material which comprises heating C-stage thermosetting resin impregnated fabric sheet material of $\frac{1}{16}$" thickness to an optimum temperature in the neighborhood of 300° F., with sufficient rapidity to prevent substantial deterioration of the material and for not more than about three minutes, whereby the material is placed in a moldable condition, shaping the material while in that condition, and restraining the material in the shape thus imparted to it while allowing it to cool to a temperature at which it acquires a set.

9. The process of shaping thermo-setting material which comprises heating C-stage thermosetting sheet material to a temperature not lower than substantially 250° F. and below its blistering temperature with sufficient rapidity to prevent substantial deterioration and for not more than about three minutes, whereby the material is placed in a moldable condition, shaping the material while in that condition, and permitting the material to cool until it acquires a set.

10. The process of shaping thermo-setting material which comprises heating C-stage thermosetting resin impregnated fabric sheet material, for a period of about three minutes, to a temperature in the neighborhood of 300° F. so as to impart to the material optimum forming flexibility, shaping the heated material, and permitting the material to cool while holding it in shaped form whereby to fix the same in desired shape.

11. The process of shaping thermo-set material, which comprises, heating C-stage thermoset resin impregnated fibrous sheet material throughout its thickness to a temperature in a range between 250° F. and 350° F. for a time sufficient only to produce within the material a temperature within said range and to impart to the material optimum forming flexibility, shaping the heated material and permitting the material to cool while holding it in shaped form whereby to fix same in desired shape.

12. The process of shaping thermo-set material, which comprises, heating phenolic aldehyde C-stage thermo-set resin impregnated fibrous sheet material throughout its thickness to a temperature in a range between 250° F. and 350° F. for a time sufficient only to produce within the material a temperature within said range and to impart to the material optimum forming flexibility, shaping the heated material and permitting the material to cool while holding it in shaped form whereby to fix same in desired shape.

13. The process of shaping thermo-set material, which comprises, heating C-stage thermoset resin impregnated heat and pressure laminated woven fabric material throughout its thickness to a temperature in a range between 250° F. and 350° F. for a time sufficient only to produce within the material a temperature within said range and to impart to the material optimum forming flexibility, shaping the heated material and permitting the material to cool while holding it in shaped form whereby to fix same in desired shape.

14. The process of shaping thermo-set material, which comprises, heating C-stage thermoset resin impregnated heat and pressure laminated porous paper material throughout its thickness to a temperature in a range between 250° F. and 350° F. for a time sufficient only to produce within the material a temperature within said range and to impart to the material optimum forming flexibility, shaping the heated material and permitting the material to cool while holding it in shaped form whereby to fix same in desired shape.

15. The process of shaping thermo-set material, which comprises, rapidly heating C-stage thermo-set impregnated fibrous sheet material throughout its thickness to a temperature in a range between 250° F. and 350° F. for a time sufficient to produce within the material a temperature within said range and to impart to the material optimum forming flexibility but insufficient to cause deterioration of said material, shaping the heated material and permitting the material to cool while holding it in shaped form whereby to fix same in desired shape.

WILLIAM I. BEACH.
    ROBERT L. WHANN.
    ALGOT S. PETERSON.

REFERENCES CITED

The following references are of record in the file of this patent:

FOREIGN PATENTS

| Number | Country | Date |
|---|---|---|
| 371,344 | Great Britain | Apr. 18, 1932 |